US011731763B2

(12) United States Patent
Balasubramanian et al.

(10) Patent No.: US 11,731,763 B2
(45) Date of Patent: Aug. 22, 2023

(54) METHODS AND SYSTEMS FOR IDENTIFYING AND ADDRESSING PASSENGER ISSUES IN AN AIRCRAFT

(71) Applicant: Honeywell International Inc., Charlotte, NC (US)

(72) Inventors: Jayasenthilnathan Balasubramanian, Phoenix, AZ (US); Srihari Jayathirtha, Atlanta, GA (US)

(73) Assignee: Honeywell International Inc., Charlotte, NC (US)

( * ) Notice: Subject to any disclaimer, the term of this patent is extended or adjusted under 35 U.S.C. 154(b) by 63 days.

(21) Appl. No.: 17/337,894

(22) Filed: Jun. 3, 2021

(65) Prior Publication Data

US 2022/0388661 A1  Dec. 8, 2022

(51) Int. Cl.
*B64D 11/00* (2006.01)
*H04W 4/42* (2018.01)
(Continued)

(52) U.S. Cl.
CPC ....... *B64D 11/0015* (2013.01); *G08G 5/0013* (2013.01); *G08G 5/0039* (2013.01);
(Continued)

(58) Field of Classification Search
None
See application file for complete search history.

(56) References Cited

U.S. PATENT DOCUMENTS 8,032,267 B1 * 10/2011 Simon .................. G01C 23/005
701/4

9,315,152 B1    4/2016 Maestas et al.
(Continued)

FOREIGN PATENT DOCUMENTS

| EP | 1713381 B1 | 10/2006 | | |
|---|---|---|---|---|
| JP | 2021508521 A | * | 3/2023 | ........... G01S 17/023 |
| WO | WO-2015200224 A2 | * | 12/2015 | ............. B60K 35/00 |

OTHER PUBLICATIONS

Kedia, Pranav et al., "Design and development of an autonomous in-seat passenger state identification in a modern vigilance enabled public transportation system", https//www.researchgate.net/publication/335884159_Design_and_devlogment_of_an_autonomous_in-seat_passenger_state_identification_in_a_modern_vigilance_enabled_public_transportation_system [Retrieved Jun. 2, 2021].

*Primary Examiner* — Fekadeselassie Girma
(74) *Attorney, Agent, or Firm* — Bookoff McAndrews, PLLC

(57) ABSTRACT

Disclosed are methods and systems for identifying and addressing passenger issues in an aircraft. For instance, the method may include receiving sensor data corresponding to one or more sensors associated with a passenger compartment of the aircraft, analyzing the received sensor data to determine a condition of the passenger compartment of the aircraft, identifying one or more passenger issues occurring in the aircraft, and determining one or more response options to address the one or more passenger issues, based at least in part on the one or more passenger issues and an operational parameter of the aircraft. The method may further include communicating, the one or more passenger issues and the one or more response options to a passenger user interface or a ground control station and modifying an operation of the aircraft in accordance with one or more of the one or more response options.

20 Claims, 3 Drawing Sheets

(51) Int. Cl.
*H04W 4/90* (2018.01)
*G08G 5/00* (2006.01)

(52) U.S. Cl.
CPC ............ *G08G 5/0056* (2013.01); *H04W 4/42* (2018.02); *H04W 4/90* (2018.02)

(56) References Cited

U.S. PATENT DOCUMENTS

| | | | |
|---|---|---|---|
| 9,858,823 B1* | 1/2018 | Lynn | G07C 5/085 |
| 10,308,141 B1* | 6/2019 | Burks | G01G 19/414 |
| 2002/0121981 A1 | 9/2002 | Munch | |
| 2012/0112915 A1 | 5/2012 | Strumolo | |
| 2013/0144470 A1* | 6/2013 | Ricci | G08G 1/096716 701/2 |
| 2013/0218594 A1* | 8/2013 | Skocic | G06Q 10/10 705/3 |
| 2013/0226408 A1* | 8/2013 | Fung | B60K 28/06 701/1 |
| 2013/0338857 A1* | 12/2013 | Sampigethaya | G06F 17/00 701/3 |
| 2016/0001781 A1* | 1/2016 | Fung | G07C 9/37 701/36 |
| 2016/0340006 A1 | 11/2016 | Tang | |
| 2017/0108862 A1* | 4/2017 | Mikkelsen | G05D 1/0061 |
| 2017/0270252 A1* | 9/2017 | Feit | H04W 4/90 |
| 2018/0348759 A1* | 12/2018 | Freeman | A61N 1/3904 |
| 2018/0374368 A1 | 12/2018 | Bolling | |
| 2019/0019394 A1* | 1/2019 | King | G08B 21/0208 |
| 2019/0359056 A1* | 11/2019 | Wilson | G08B 21/06 |
| 2019/0359220 A1* | 11/2019 | Wilson | G05D 1/0055 |
| 2019/0361451 A1* | 11/2019 | Wilson | G08G 1/205 |
| 2019/0391581 A1 | 12/2019 | Vardaro et al. | |
| 2020/0079524 A1* | 3/2020 | Escobar | B64D 11/0606 |
| 2020/0320864 A1* | 10/2020 | Wengreen | G08G 1/0112 |
| 2021/0027636 A1* | 1/2021 | Dziecielski | G08G 5/0026 |
| 2021/0171039 A1* | 6/2021 | Weissert | B60W 50/14 |
| 2021/0309259 A1* | 10/2021 | Stumpf | B60W 60/0024 |
| 2022/0348352 A1* | 11/2022 | Kunz | B64D 45/00 |

\* cited by examiner

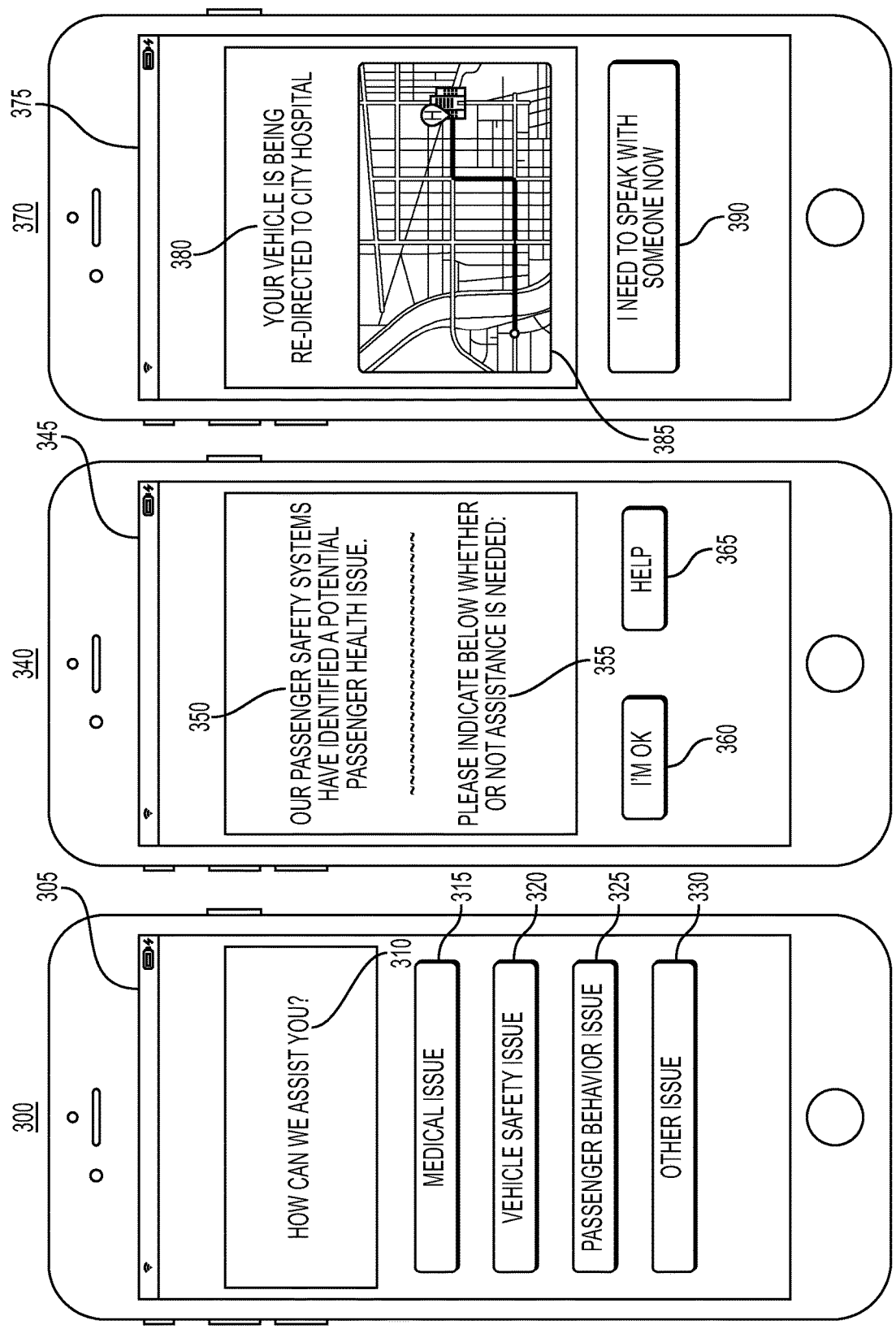

METHODS AND SYSTEMS FOR IDENTIFYING AND ADDRESSING PASSENGER ISSUES IN AN AIRCRAFT

TECHNICAL FIELD

Various embodiments of the present disclosure relate generally to the field of passenger safety for urban air mobility vehicles and, more particularly, to methods and systems for identifying and addressing passenger issues in an aircraft.

BACKGROUND

In modern aviation, passengers are typically well-connected to information regarding the progress of their flight. For example, on crewed flights, pilots and cabin crew make announcements and provide any safety and routing updates to the passengers as needed. On these piloted flights, the onboard flight and cabin staff are well-trained to handle passenger issues and/or emergency situations, as well as to make decisions with respect to diverting the flight for emergency assistance. The cabin crew can also attend to specific needs of the passengers including medical assistance (e.g., CPR, first aid), or addressing issues concerning the safety of flight such as diffusing passenger disputes. However, as autonomous aerial vehicles begin carrying passengers, there may be no trained onboard flight crew to provide this assistance.

The present disclosure is directed to overcoming one or more of these above-referenced challenges.

SUMMARY OF THE DISCLOSURE

According to certain aspects of the disclosure, methods and systems are disclosed for identifying and addressing passenger issues in an aircraft.

For instance, a method of identifying and addressing passenger issues in an aircraft may include obtaining, by an activity detection module, sensor data corresponding to one or more sensors associated with a passenger compartment of the aircraft, analyzing the sensor data to determine a condition of the passenger compartment of the aircraft, and identifying, based on the condition of the passenger compartment of the aircraft, one or more passenger issues occurring in the aircraft. The method may further include determining, in response to identifying the one or more passenger issues occurring, one or more response options to address the one or more passenger issues, based at least in part on the one or more passenger issues and an operational parameter of the aircraft, communicating, via a connectivity gateway device, the one or more passenger issues and the one or more response options to a passenger user interface or a ground control station, and modifying an operation of the aircraft in accordance with one or more of the one or more response options.

Moreover, a system may include an activity detection module in communication with one or more sensors associated with a passenger compartment of an aircraft, a memory storing instructions, and a processor executing the instructions to perform a process for identifying and addressing passenger issues in the aircraft. The process may include obtaining, by the activity detection module, sensor data corresponding to the one or more sensors, analyzing the sensor data to determine a condition of the passenger compartment of the aircraft, and identifying, based on the condition of the passenger compartment of the aircraft, one or more passenger issues occurring in the aircraft. The process may further include determining, in response to identifying the one or more passenger issues occurring, one or more response options to address the one or more passenger issues, based at least in part on the one or more passenger issues and an operational parameter of the aircraft, communicating, via a connectivity gateway device, the one or more passenger issues and the one or more response options to a passenger user interface or a ground control station, and modifying an operation of the aircraft in accordance with one or more of the one or more response options.

Moreover, a system may include one or more sensors associated with a passenger compartment of an aircraft including at least a microphone and a camera, an activity detection module in communication with the one or more sensors associated with the passenger compartment of the aircraft, a memory storing instructions, and a processor executing the instructions to perform a process for identifying and addressing passenger issues in the aircraft. The process may include obtaining, by the activity detection module, sensor data corresponding to the one or more sensors, analyzing the sensor data to determine a condition of the passenger compartment of the aircraft, obtaining one or more passenger profiles including medical information pertaining to one or more passengers in the passenger compartment of the aircraft, and identifying, based on the condition of the passenger compartment of the aircraft and the one or more passenger profiles, one or more passenger issues occurring in the aircraft. The process may further include determining, in response to identifying the one or more passenger issues occurring, one or more response options to address the one or more passenger issues, based at least in part on the one or more passenger issues and an operational parameter of the aircraft, communicating, via a connectivity gateway device, the one or more passenger issues and the one or more response options to a passenger user interface or a ground control station, and modifying an operation of the aircraft in accordance with one or more of the one or more response options.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 3A-3C depict exemplary GUIs that a system may provide to a passenger, according to one or more embodiments.

DETAILED DESCRIPTION OF EMBODIMENTS

Various embodiments of the present disclosure relate generally to the field of passenger safety for urban air mobility vehicles and, more particularly, to methods and systems for identifying and addressing passenger issues in an aircraft.

In general, the present disclosure is directed to methods and systems that address one or more of the above challenges by monitoring the passenger compartment of a vehicle in order to identify issues that may impact the comfort and/or safety of one or more passengers. For instance, a system may begin responding to an indication of a passenger issue even before an operator on the ground is able to initiate communication with the aircraft. The systems and/or methods of the present disclosure for identifying and addressing passenger issues in an aircraft may provide additional passenger safety by enabling mitigative action to be taken with or without the passengers being conscious or otherwise able to recognize and report the issue themselves. By monitoring the passenger compartment of an aircraft and identifying passenger issues, potentially undesirable situations may be addressed more quickly and/or more effectively than in vehicles that require passengers to identify issues and attempt to contact an operator or other aircraft safety personnel. Further, by monitoring the passenger compartment and identifying potential issues automatically, issues that arise without one or more passengers being consciously aware of the issue may also be mitigated, where such issues otherwise may not.

While this disclosure describes the methods and systems with reference to aircraft, it should be appreciated that the present methods and systems may be applicable to various other passenger vehicles on which passenger issues may arise during flight, including helicopters, planes, or any other manned, unmanned, autonomous, and/or internet-connected passenger vehicles.

Figure 1:
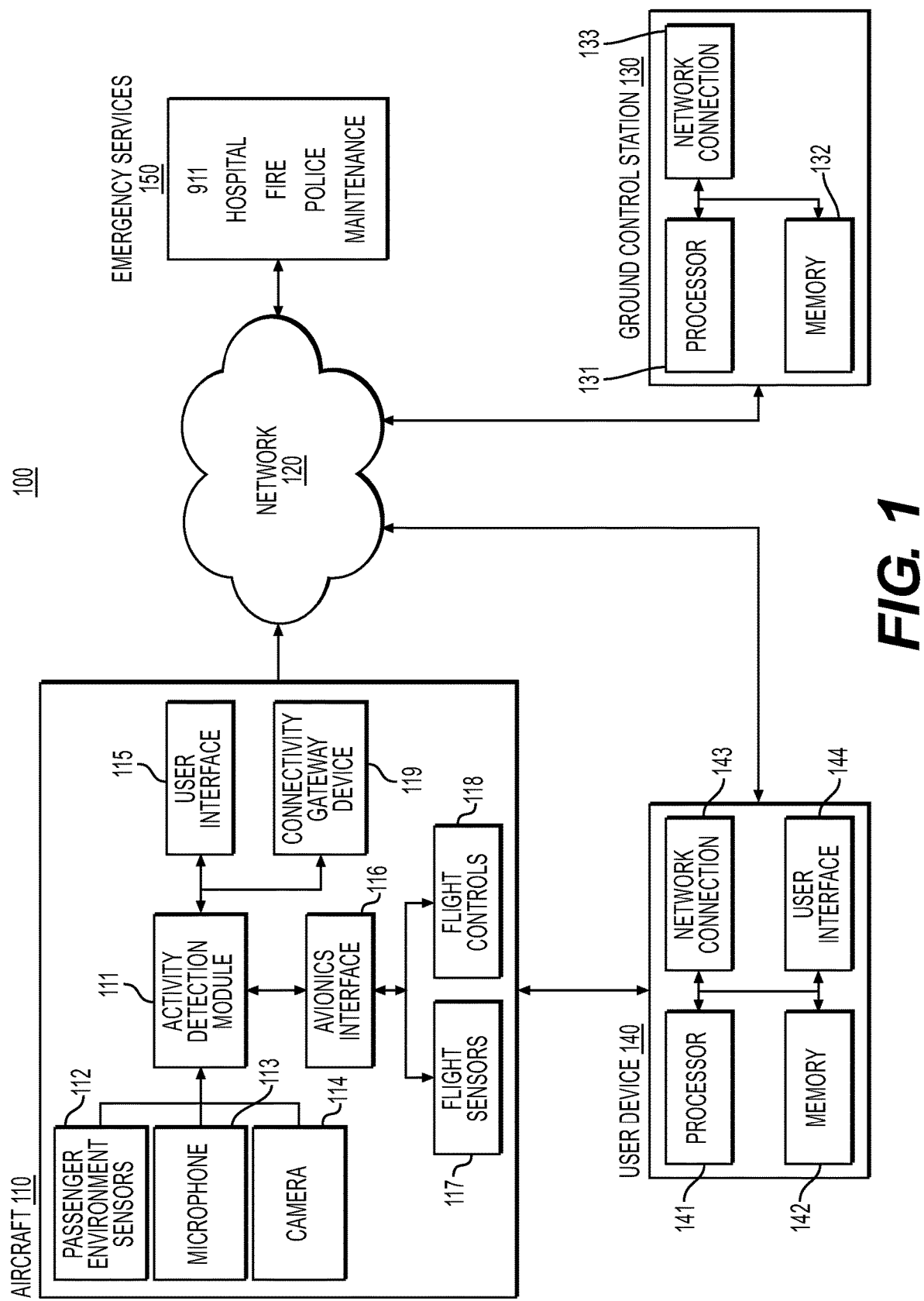
FIG. 1 depicts an exemplary system environment in which methods, systems, and other aspects of the present disclosure may be implemented.

FIG. 1 depicts an example of a system environment 100 in which systems, methods, and other aspects of the present disclosure may be implemented. The system environment 100 of FIG. 1 may include an aircraft 110, a network 120, one or more ground control stations 130, one or more user devices 140, and emergency services 150. Aircraft 110 can be equipped with an activity detection module 111, which may receive signal inputs from, for example, one or more passenger environment sensors 112, a microphone 113, and/or a camera 114. Activity detection module 111 may be in communication with a user interface 115, an avionics interface 116, and/or a connectivity gateway device 119 associated with aircraft 110.

Avionics interface 116 may be in communication with flight sensors 117 and flight controls 118 to control and monitor various aspects of the aircraft's flight, including, for example, the flight path of aircraft 110. Some or all of avionics interface 116, flight sensors 117, and/or flight controls 118 may be a part of a flight management system for aircraft 110. Flight sensors 117 may include, for example, GPS, altimeters, airspeed indicators, vertical speed indicators, compasses, artificial horizons, attitude indicators, and fuel/battery level sensors. Aircraft 110 can also be equipped with one or more modes of communicating, such as a connectivity gateway device 119 that may include a wireless transceiver and/or a network connection.

Network 120 may be implemented as, for example, the internet, a wireless network, a wired network (e.g., Ethernet), a local area network (LAN), a Wide Area Network (WANs), Bluetooth, Near Field Communication (NFC), or any other type of network including a combination of such networks that provides communication capabilities between one or more components of the system environment 100. In some embodiments, the network 120 may be implemented using a suitable communication protocol or combination of protocols such as an internet connection in combination with a cellular or satellite data network. Network 120 may also include radio frequency (RF) communication or other such suitable manner of communicating between aircraft 110 and one or more components of system environment 100.

Aircraft 110 may communicate with one or more ground stations 130 via network 120, including via direct RF communication, in order to obtain information regarding, for example, air traffic control, weather reports, medical instructions and/or information, and other emergency services 150. Each ground station 130 may include a processor 131 provided with memory 132 and a network connection 133. In some embodiments, memory 132 can store navigation information to aid aircraft 110 and/or information obtained from aircraft 110, such as information from passenger environment sensors 112, microphone 113, and/or camera 114. Network connection 133 may be provided to allow ground station 130 to communicate with other elements in system environment 100 via network 120.

Aircraft 110 may also communicate with one or more user devices 140 associated with one or more passengers of aircraft 110. User devices 140 can be, for example, computers, telephones, tablets, fitness trackers, smartwatches, or other devices that can allow a person to access the internet and/or connectivity gateway device 119. Each user device 140 may include a processor 141, a memory 142, a network connection 143, and a display/user interface (UI) 144.

Display/UI 144 can be in communication with processor 141 to provide the user or users of the device with a connection to aircraft 110, ground control station 130, and/or emergency services 150. In some embodiments in accordance with the present disclosure, display/UI 144 may include one or more monitors, touchscreen panels, keyboards, keypads, mice/trackpads, and/or other suitable devices for displaying information to, or for receiving inputs from, users of user device 140. User devices 140 may be capable of allowing a user to, for example and not limitation, receive user input via display/UI 144 and transmit that user input to one or more other elements in system environment 100. Display/UI 144 may also provide the user with information regarding aircraft 110 (e.g., the location, path, operating status) and/or the status of emergency services 150 or the like.

Emergency services 150 may include, for example, such services as 911 dispatch (or other emergency number), hospital services, fire departments, police departments, and/or aircraft maintenance services. These services can be connected to one or more of the other elements of the system environment 100 via network 120. The connection between emergency services 150 and one or more of the elements of system environment 100 may be made directly via network 120, or may be relayed between one or more of the elements on system environment 100, as appropriate. For example, user device 140 may connect to the aircraft via connectivity gateway device 119, which in turn may be in contact with ground control station 130 and/or emergency services 150. This connection may be able to provide airborne passengers with a communication channel to one or more emergency service providers, for example, a healthcare provider or a member of law enforcement.

Figure 2:
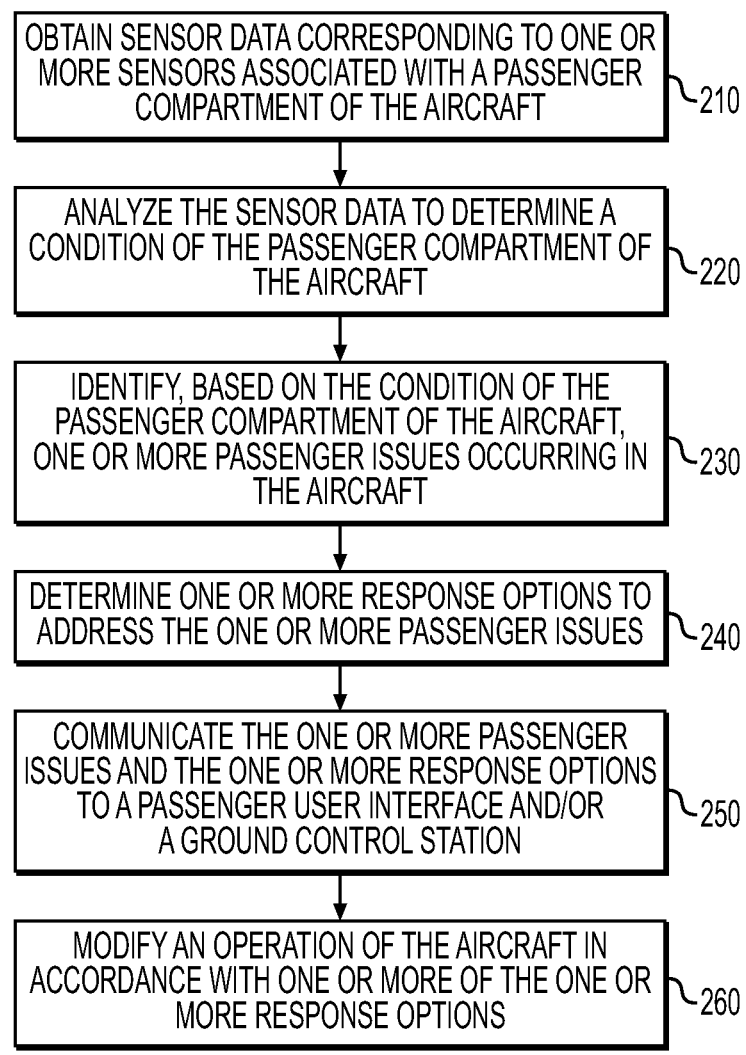
FIG. 2 depicts a flowchart for an exemplary process for identifying and addressing passenger issues in an aircraft, according to one or more embodiments.

FIG. 2 illustrates an exemplary method 200 for identifying and addressing passenger issues in an aircraft in accordance with embodiments of the present disclosure. It should be understood that the steps described herein, and the sequence in which they are presented, are merely illustrative such that additional and/or fewer steps may be included without departing from the scope of the present disclosure.

Beginning at step 210, activity detection module 111 may be configured to obtain sensor data corresponding to sensors associated with the passenger compartment of aircraft 110. This sensor data may be obtained from, for example, passenger environment sensors 112, microphone(s) 113, and/or camera(s) 114. In some embodiments, activity detection module 111 may be configured to obtain sensor data from one or more user devices 140, such as sound information from a microphone associated with a user device 140 or biometric information such as a passenger's heart rate. The data collected by these sensors may correspond to one or more environmental conditions of the passenger compartment and/or passengers, such as air quality, noise level, and passenger location/activity.

Once the sensor data is obtained, at step 220, the system may then analyze and evaluate the sensor data to determine a condition of the passenger compartment of aircraft 110. In some embodiments, this analysis may take the form of monitoring the sensor data in real time for anomalies, such as variations in air quality, loud and/or specific sounds, motion indicative of an issue, and/or an irregular heartrate of a passenger. For example, environment sensors 112 may be configured to monitor the air in the passenger compartment of aircraft 110 for smoke, carbon monoxide, and/or temperature. In the event that one or more environment sensors 112 report a reading that is unexpected and/or beyond a certain threshold, activity detection module 111 may determine an anomalous condition in the passenger compartment. Similarly, microphone(s) 113 may monitor the passenger compartment for specific sounds (e.g., specific words such as "help" or "fire", glass breaking), and/or may monitor the sound levels in the passenger compartment. In some embodiments, camera(s) 114 may monitor the passenger behavior in the passenger compartment, and may be capable of identifying issues based on the observed behaviors. This may be accomplished via, for example, facial recognition software and/or machine-learning algorithms trained to identify behaviors such as a person having a health issue or passengers having a physical dispute.

At step 230, activity detection module 111 may identify, based on the condition of the passenger compartment of the aircraft and/or passenger profile information, one or more particular passenger issues that may be occurring. In some embodiments, activity detection module 111 identifies passenger issues using machine learning techniques, with the analysis and identification being carried out by an onboard processor, remotely via one or more ground-based/cloud-based processors, and/or a combination of such processors. The machine learning algorithm may be trained on, for example, control examples, previously identified issues on aircraft 110 (including other networked aircraft equipped with activity detection modules), and/or using supervised learning techniques. Activity detection module may be configured to regularly connect to a cloud-based server or ground station to update the software responsible for the analysis and/or identifying steps 220, 230. In some embodiments, firmware present in activity detection module 111 may be updated during routine maintenance between flights.

In some embodiments, passengers or aircraft operators are able to create passenger profiles for one or more potential aircraft passengers. These profiles may contain, for example, health related information, such as a condition that may arise during flight (e.g., a seizure disorder, pregnancy, or heart condition) and/or an issue that may arise in the event of an aircraft malfunction or accident (e.g., asthma or blood clotting condition). This passenger profile data may further include biometric data to confirm an identity of a passenger as well as emergency contact information.

Medical information regarding a passenger may allow activity detection module 111 to identify the one or more passenger issues through a comparison between a condition observed in the passenger compartment and health-related information, such as medical criteria included in the passenger profile. For example, if a condition determined includes a passenger making particular repetitive motions, comparing the condition to medical criteria for a known seizure disorder, may assist activity detection module in identifying a particular passenger issue.

In some situations, the passenger compartment environment may deteriorate unexpectedly and activity detection module may identify an issue accordingly. For example, if at step 220, the activity detection module 111 determines that the air temperature in the passenger compartment is higher than expected and that the carbon monoxide levels are also above an expected amount, at step 230, activity detection module 111 may identify a passenger issue such as an exhaust leak. In another circumstance, at step 220, the activity detection module 111 may determine that the passengers are in physical contact and may also determine an elevated sound level in the passenger compartment indicative of yelling. These conditions may allow activity detection module 111 to identify a fight or argument as a passenger issue occurring in the passenger compartment of aircraft 110.

In some embodiments, activity detection module 111 may include one or more thresholds that the sensor data must reach prior to identifying a particular passenger issue. These thresholds may be configured such that activity detection module 111 may require multiple sensors to verify the existence of certain passenger issues. For example, activity detection module 111 may identify a passenger issue such as a passenger dispute when microphone 113 in the passenger compartment of the aircraft and a second microphone (e.g., the microphone on a user device 140) both detect sounds indicative of a dispute. This verification or redundancy may assist activity detection module 111 in identifying passenger issues, while avoiding false positives in situations where such false positives would be potentially disruptive to the flight of the aircraft.

Once activity detection module 111 has identified one or more passenger issues, at step 240, it may then determine appropriate response options to address the passenger issues based on a number of factors. For example, factors that activity detection module 111 may base its determination on can include the condition of the passenger compartment of aircraft 110, the passenger issue, and operational parameters of aircraft 110 (e.g., location, altitude, speed, fuel/power level). In the event of an exhaust leak, for example, activity detection module may determine that a combustion engine may be shut down so that aircraft 110 may operate on a battery backup or alternative power source, or activity detection module 111 may determine that additional passenger compartment venting and an emergency landing would address the passenger issue. As another example, in the event of a passenger dispute as an identified passenger issue, appropriate response options may be to audibly warn the passengers that further conduct will result in an emergency landing of the aircraft and/or to notify the passengers that the police will be called to the landing site of aircraft 110. The determination of these response options may be based on, for example, a machine-learning algorithm or specific programming.

Depending on what the passenger issue(s) is/are and the potentially appropriate response options to address those issues, at step 250, activity detection module 111 may communicate the identified issues and/or the response options to, for example, the passengers and/or a crew at a ground control station 130. In some embodiments, the passenger issues and response options may be provided to the passengers via user interface 115 and/or via user devices 140 present in the passenger compartment. An example of such a notification is discussed below with respect to FIGS. 3A-C. In addition to identified issues and response options, activity detection module 111 can also communicate safety information (e.g., safety briefings, situationally aware emergency exit instructions), passenger instructions (e.g., instructions to remain seated, to keep seatbelts fastened, to stop smoking/vaping), warnings (e.g. turbulence ahead), and/or flight status updates (e.g., time to destination, routing changes).

In the event that the response options are communicated to the passengers via the passenger user interface, passengers may provide responses or additional information to activity detection module 111 user via user device 140. To facilitate this interaction, one or more graphical user interfaces may be employed to provide and/or collect information. FIGS. 3A-3C illustrate exemplary graphical user interfaces (GUIs) 300, 340, 370 that may be displayed on user device 140 and/or user interface 115. GUIs 300, 340, 370 may, for example, represent the user interfaces used to directly report an issue, confirm or otherwise provide information regarding an issue, and providing the passenger with updated information regarding the corrective action being taken to address the passenger issue.

For example, GUI 300 may represent an exemplary user interface that a user may see when using a user device 140 or user interface 115 to report an issue directly. GUI 300 may have a window 305 (e.g., a browser displayed webpage, whether on mobile or desktop device, or an application interface, whether on a mobile or desktop device) that includes the graphical elements that allow the user to interact with GUI 300 to report or identify an issue. Heading text 310 can identify GUI 300 as an interface with which the user may request assistance, so as to distinguish it from other GUIs associated with this or other systems, websites, and applications. Below heading text 310, GUI 300 may include a series of input elements, such as a series of elements 315, 320, 325, 330 that each correspond to a category of passenger issues. These elements may include, for example, a medical issue 315, a vehicle safety issue 320, a passenger behavior issue 325, or another issue 330 not covered by the previous options. The user may be able to select or otherwise convey a selection via GUI 300 and/or user interfaces 115, 144 to provide activity detection module 111 with input regarding the condition of the passenger compartment.

In some circumstances, the activity detection module 111 may have identified a potential passenger issue automatically, for example, in response to unexpected sensor data from passenger environment sensors 112, microphone(s) 113, and/or camera(s) 114. In such situations, activity detection module 111 may endeavor to confirm the passenger issue via user interfaces 115, 144, and may display GUI 340 to the passengers. GUI 340 may have a window 345, heading text 350, and instructions 355. For example, heading text 350 may notify the passenger(s) that a particular potential issue has been identified, and instructions 355 may indicate how the passenger(s) is/are to respond. Response options may be provided, such as an indication that no issue is present 360 (e.g., "I'm OK") or an indication that the detected issue is, in fact, present 365 (e.g., "Help"). GUI 340 may be able to avoid certain false alarms, such as when a passenger appears to be suffering a health emergency, but in fact is not.

Another potential role of user interfaces 115, 144 is to communicate the status of actions taken to address a passenger issue to the passenger(s). For example, GUI 370 may have a window 375 that includes the graphical elements that allow activity detection module 111 to communicate the status of aircraft 110 to the passenger(s). Heading text 380 can identify GUI 370 as an interface that is providing the user with information regarding modifications to the operation of aircraft 110, such as a change to the destination. Element 385 may provide additional information regarding the modifications, such as providing a map view of the present position of aircraft 110 and its destination. In the event that the modifications to the operation of the aircraft are in error, unnecessary, and/or are not understood by the passenger(s), element 390 may be provided to enable the passenger(s) to contact personnel located, for example, at a ground control station 130 or at an emergency service 150.

GUIs 300, 340, and 370 represent examples of ways in which activity detection module 111 may communicate and/or solicit input from the passenger(s) via user interfaces 115, 144. Other GUIs may also be employed to provide information to, or obtain information from the passenger(s) in the passenger compartment of aircraft 110 to address and/or identify passenger issues. In some embodiments, in lieu of or in addition to notifying or attempting to notify the onboard passengers, activity detection module may directly contact ground control station 130 and/or emergency services 150.

Returning to FIG. 2, in some cases, the passenger(s) may be able to select an appropriate response option to address the passenger issue, while in some cases intervention from outside the aircraft may be beneficial. For example, while a passenger may be able to select a response option to address a temperature issue in the passenger compartment, they may not be able to do so in the event that they are having a health related incident. In circumstances requiring outside intervention, personnel located at a ground control station 130 or a hospital may be involved to select an appropriate response option, such as diverting the aircraft 110 to a hospital or safe landing location.

Having determined (automatically, by consultation with the passenger(s), and/or by consulting personnel on the ground) an appropriate action to remediate the passenger issue, at step 260, activity detection module 111 may modify an operation of aircraft 110 in accordance with the one or more response options selected or chosen. Such modifications to the operation of aircraft 110 may be effected by communicating with the avionics interface 116, which in turn may adjust the flight or other characteristics of the operation of aircraft 110. Avionics interface 116 can be configured to, for example, navigate aircraft 110 to modify a flight plan and/or control onboard systems of aircraft 110 (e.g., climate control, ventilation, fire suppression, safety restraints) to address a passenger environment issue.

Methods and systems for identifying and addressing passenger issues in an aircraft in accordance with the present disclosure may be able to provide passengers in an autonomous aircraft with a way to report issues that arise during a flight and may also provide the aircraft with the ability to monitor the passenger compartment to automatically identify potential issues. This may enable the passengers of an autonomous aircraft to feel more safe and comfortable while in the aircraft as well as allowing the aircraft to more safely navigate an airspace without a crew onboard. Because an issue that arises while an un-crewed aircraft is in flight may go unaddressed or unreported, an aircraft that provides systems to report issues and that is capable of monitoring the passenger compartment for the existence of any passenger issues may be more safe for the passengers, and may be able to address issues that arise in a more timely manner than it would otherwise be able. As un-crewed and autonomous aircraft become increasingly used for passenger flights, including UAMs, the ability to operate more safely without an onboard crew may support additional passenger adoption of un-crewed flight options such as UAMs, and more prompt addressing of passenger issues may reduce the operating costs of such aircraft.

The general discussion of this disclosure provides a brief, general description of a suitable computing environment in which the present disclosure may be implemented. In one embodiment, any of the disclosed systems and/or methods may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the internet. Similarly, techniques presented herein as involving multiple devices may be implemented in a single device. In a distributed computing environment, program modules may be located in both local and/or remote memory storage devices.

As used herein, a "machine learning model" is a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine learning model may operate on an input linearly, in parallel, via a network (e.g., a neural network), or via any suitable configuration.

The execution of the machine learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the embodiments disclosed herein. It is intended that the specification and examples be considered as exemplary only, with a true scope and spirit of the present disclosure being indicated by the following claims.

What is claimed is:

1. A method of identifying and addressing passenger issues in an autonomous unpiloted aircraft, the method comprising:
    obtaining, by an activity detection module, sensor data corresponding to one or more sensors associated with a passenger compartment of the autonomous unpiloted aircraft;
    analyzing the sensor data to determine a condition of the passenger compartment of the autonomous unpiloted aircraft;
    identifying, based on the condition of the passenger compartment of the autonomous unpiloted aircraft, one or more passenger issues occurring in the autonomous unpiloted aircraft;
    determining, in response to identifying the one or more passenger issues occurring, one or more response options to address the one or more passenger issues, based at least in part on the one or more passenger issues and an operational parameter of the autonomous unpiloted aircraft;
    communicating, via a connectivity gateway device, the one or more passenger issues and the one or more response options to a passenger user interface or a ground control station; and
    modifying an operation of the autonomous unpiloted aircraft in accordance with one or more of the one or more response options, wherein at least one of the one or more response options comprises changing the flight plan of the autonomous unpiloted aircraft and performing an emergency landing.

2. The method of claim 1, wherein the activity detection module obtains the sensor data from the one or more sensors including a camera and a microphone.

3. The method of claim 2, wherein:
    the sensor data corresponds to observed behavior in the passenger compartment of the autonomous unpiloted aircraft; and
    analyzing the sensor data includes using a passenger behavior model to evaluate the observed behavior in the passenger compartment of the autonomous unpiloted aircraft to determine the condition of the passenger compartment of the autonomous unpiloted aircraft.

4. The method of claim 1, wherein the sensor data corresponds to one or more environmental conditions in the passenger compartment of the autonomous unpiloted aircraft.

5. The method of claim 1, wherein the activity detection module obtains the sensor data from one or more sensors associated with one or more user devices located in the passenger compartment of the autonomous unpiloted aircraft.

6. The method of claim 1, further comprising:
    in response to identifying the one or more passenger issues, transmitting a request for confirmation from the connectivity gateway device to the passenger user interface; and
    receiving, from the passenger user interface, a response indicative of whether or not the one or more passenger issues require further intervention.

7. The method of claim 1, wherein identifying the one or more passenger issues occurring in the autonomous unpiloted aircraft is based at least in part on one or more passenger profiles including medical information, and wherein identifying the one or more passenger issues includes comparing the condition of the passenger compartment to one or more medical criteria included in the medical information.

8. The method of claim 1, wherein determining the one or more response options to address the one or more passenger issues is based on the operational parameter of the autonomous unpiloted aircraft received by the activity detection module from an avionics interface.

9. The method of claim 1, wherein the one or more passenger issues occurring in the autonomous unpiloted aircraft include a medical emergency, and the modification made to the operation of the autonomous unpiloted aircraft includes modifying a flight plan for the autonomous unpiloted aircraft.

10. The method of claim 1, wherein the modification made to the operation of the autonomous unpiloted aircraft further includes opening a communication channel between the passenger compartment of the autonomous unpiloted aircraft and a healthcare provider.

11. A system comprising:
    an activity detection module in communication with one or more sensors associated with a passenger compartment of an autonomous unpiloted aircraft;
    a memory storing instructions; and
    a processor executing the instructions to perform a process for identifying and addressing passenger issues in the autonomous unpiloted aircraft including:
    obtaining, by the activity detection module, sensor data corresponding to the one or more sensors;
    analyzing the sensor data to determine a condition of the passenger compartment of the autonomous unpiloted aircraft;
    identifying, based on the condition of the passenger compartment of the autonomous unpiloted aircraft, one or more passenger issues occurring in the autonomous unpiloted aircraft;
    determining, in response to identifying the one or more passenger issues occurring, one or more response options to address the one or more passenger issues, based at least in part on the one or more passenger issues and an operational parameter of the autonomous unpiloted aircraft;

communicating, via a connectivity gateway device, the one or more passenger issues and the one or more response options to a passenger user interface or a ground control station; and modifying an operation of the autonomous unpiloted aircraft in accordance with one or more of the one or more response options, wherein at least one of the one or more response options comprises changing the flight plan of the autonomous unpiloted aircraft and performing an emergency landing.

12. The system of claim 11, wherein the activity detection module obtains the sensor data from the one or more sensors including a camera and a microphone.

13. The system of claim 12, wherein:
the sensor data corresponds to observed behavior in the passenger compartment of the autonomous unpiloted aircraft; and
analyzing the sensor data includes using a passenger behavior model to evaluate the observed behavior in the passenger compartment of the autonomous unpiloted aircraft to determine the condition of the passenger compartment of the autonomous unpiloted aircraft.

14. The system of claim 11, wherein the sensor data corresponds to one or more environmental conditions in the passenger compartment of the autonomous unpiloted aircraft.

15. The system of claim 11, wherein the activity detection module obtains the sensor data from one or more sensors associated with one or more user devices located in the passenger compartment of the autonomous unpiloted aircraft.

16. The system of claim 11, further comprising:
in response to identifying the one or more passenger issues, transmitting a request for confirmation from the connectivity gateway device to the passenger user interface; and
receiving, from the passenger user interface, a response indicative of whether or not the one or more passenger issues require further intervention.

17. The system of claim 11, wherein determining the one or more response options to address the one or more passenger issues is based on the operational parameter of the autonomous unpiloted aircraft received by the activity detection module from an avionics interface.

18. The system of claim 11, wherein the one or more passenger issues occurring in the autonomous unpiloted aircraft include a medical emergency, and the modification made to the operation of the autonomous unpiloted aircraft includes modifying a flight plan for the autonomous unpiloted aircraft.

19. The system of claim 11, wherein the modification made to the operation of the autonomous unpiloted aircraft further includes opening a communication channel between the passenger compartment of the autonomous unpiloted aircraft and a healthcare provider.

20. A system comprising:
one or more sensors associated with a passenger compartment of an autonomous unpiloted aircraft including at least a microphone and a camera;
an activity detection module in communication with the one or more sensors associated with the passenger compartment of the autonomous unpiloted aircraft;
a memory storing instructions; and
a processor executing the instructions to perform a process for identifying and addressing passenger issues in the autonomous unpiloted aircraft including:
obtaining, by the activity detection module, sensor data corresponding to the one or more sensors;
analyzing the sensor data to determine a condition of the passenger compartment of the autonomous unpiloted aircraft;
obtaining one or more passenger profiles including medical information pertaining to one or more passengers in the passenger compartment of the autonomous unpiloted aircraft;
identifying, based on the condition of the passenger compartment of the autonomous unpiloted aircraft and the one or more passenger profiles, one or more passenger issues occurring in the autonomous unpiloted aircraft;
determining, in response to identifying the one or more passenger issues occurring, one or more response options to address the one or more passenger issues, based at least in part on the one or more passenger issues and an operational parameter of the autonomous unpiloted aircraft;
communicating, via a connectivity gateway device, the one or more passenger issues and the one or more response options to a passenger user interface or a ground control station; and
modifying an operation of the autonomous unpiloted aircraft in accordance with one or more of the one or more response options, wherein at least one of the one or more response options comprises changing the flight plan of the autonomous unpiloted aircraft and performing an emergency landing.

* * * * *